/ United States Patent (12) United States Patent
Castagna et al.

(10) Patent No.: US 11,095,598 B2
(45) Date of Patent: Aug. 17, 2021

(54) MANAGING MESSAGING SERVICES (71) Applicant: Accenture Global Solutions Limited, Dublin (IE)

(72) Inventors: Raffaele Castagna, Newtownabbey (IT); Alessandro Casillo, Naples (IT); Leopoldo Elefante, Newtownabbey (IT); Francesco Di Lauro, Avellino (IT); Antonio Aliberti, Salerno (IT)

(73) Assignee: Accenture Global Solutions Limited, Dublin (IE)

( * ) Notice: Subject to any disclaimer, the term of this patent is extended or adjusted under 35 U.S.C. 154(b) by 85 days.

(21) Appl. No.: 16/573,172

(22) Filed: Sep. 17, 2019

(65) Prior Publication Data

US 2020/0014654 A1 Jan. 9, 2020

Related U.S. Application Data (62) Division of application No. 14/947,138, filed on Nov. 20, 2015, now Pat. No. 10,469,436.

(51) Int. Cl.
*H04L 12/58* (2006.01)
*H04L 29/08* (2006.01)
*H04L 12/18* (2006.01)
*G06Q 30/02* (2012.01)
*G06Q 50/00* (2012.01)

(52) U.S. Cl.
CPC .......... *H04L 51/32* (2013.01); *H04L 12/1859* (2013.01); *H04L 51/14* (2013.01); *H04L 51/36* (2013.01); *H04L 67/02* (2013.01); *G06Q 30/02* (2013.01); *G06Q 50/01* (2013.01); *H04L 51/02* (2013.01); *H04L 51/30* (2013.01)

(58) Field of Classification Search
CPC .. H04L 51/00–38; G06Q 50/01; G06Q 30/02; G06Q 30/0207–0239; G06Q 30/00–016
See application file for complete search history.

(56) References Cited

U.S. PATENT DOCUMENTS 7,224,686 B1 5/2007 Doskow et al.
7,360,090 B1 4/2008 Doskow et al.
(Continued)

FOREIGN PATENT DOCUMENTS

EP 2698955 2/2014

OTHER PUBLICATIONS

European Extended Search Report for Application No. 16195753.5, dated Apr. 21, 2017, 9 pages.

*Primary Examiner* — David R Lazaro
*Assistant Examiner* — Julian Chang
(74) *Attorney, Agent, or Firm* — Fish & Richardson P.C.

(57) ABSTRACT

In some implementations, messaging services, through which messages from an entity, such as a company, are communicated to various users, are managed. In one aspect, the techniques described may be provided by a messaging management service that keeps track of such messaging services and provides messages to users through these messaging services on behalf of various companies. In this way, the messaging management service may enable companies to quickly establish a presence on new communication platforms and more easily communicate through the mobile communication and social networking services that are most suitable to their existing and potential customers.

20 Claims, 6 Drawing Sheets

(56) References Cited

U.S. PATENT DOCUMENTS

| | | | |
|---|---|---|---|
| 7,620,691 B1* | 11/2009 | Goldman | H04L 29/12594 709/204 |
| 7,945,634 B1 | 5/2011 | Huda | |
| 8,364,770 B2 | 1/2013 | Ladouceur et al. | |
| 8,621,536 B1* | 12/2013 | Hendren | H04N 21/47202 725/104 |
| 8,768,761 B2 | 7/2014 | Eichstaedt et al. | |
| 8,886,735 B1 | 11/2014 | Liu et al. | |
| 8,972,512 B2 | 3/2015 | Mays et al. | |
| 8,990,321 B1 | 3/2015 | Korn et al. | |
| 9,166,936 B1 | 10/2015 | Stovall et al. | |
| 9,383,951 B2 | 7/2016 | Logue | |
| 9,763,090 B2 | 9/2017 | Frederick | |
| 9,769,104 B2 | 9/2017 | Appelman | |
| 9,972,015 B2* | 5/2018 | Moore | G06Q 50/01 |
| 10,469,436 B2 | 11/2019 | Castagna et al. | |
| 2002/0065896 A1* | 5/2002 | Burakoff | G06F 21/6209 709/206 |
| 2002/0082919 A1 | 6/2002 | Landau | |
| 2003/0105824 A1 | 6/2003 | Brechner | |
| 2003/0195811 A1* | 10/2003 | Hayes, Jr. | G06Q 30/0623 705/26.41 |
| 2004/0066919 A1* | 4/2004 | Seligmann | H04M 3/42229 379/88.13 |
| 2004/0068481 A1 | 4/2004 | Seshardi | |
| 2004/0110462 A1 | 6/2004 | Forstadius et al. | |
| 2004/0225652 A1 | 11/2004 | Duncan et al. | |
| 2004/0243941 A1* | 12/2004 | Fish | H04W 4/06 715/752 |
| 2005/0060417 A1* | 3/2005 | Rose | H04L 67/30 709/228 |
| 2005/0182675 A1 | 8/2005 | Huettner | |
| 2005/0220064 A1 | 10/2005 | Hundscheidt | |
| 2006/0031299 A1* | 2/2006 | Robertson | H04L 51/16 709/206 |
| 2006/0064739 A1* | 3/2006 | Guthrie | H04L 51/12 726/3 |
| 2006/0150088 A1 | 7/2006 | Kraft et al. | |
| 2006/0282312 A1* | 12/2006 | Carlson | G06Q 30/0252 705/14.5 |
| 2007/0043818 A1 | 2/2007 | Cottrille et al. | |
| 2007/0083425 A1 | 4/2007 | Cousineau | |
| 2007/0150588 A1 | 6/2007 | Ghadialy et al. | |
| 2007/0239537 A1 | 10/2007 | Protheroe | |
| 2007/0265006 A1 | 11/2007 | Washok | |
| 2008/0098073 A1 | 4/2008 | Coleman et al. | |
| 2009/0177736 A1 | 7/2009 | Christensen | |
| 2009/0187631 A1 | 7/2009 | Su | |
| 2011/0137732 A1 | 6/2011 | Averbeck | |
| 2011/0270687 A1 | 11/2011 | Bazaz | |
| 2011/0276645 A1* | 11/2011 | Andersson | H04L 51/12 709/206 |
| 2012/0289191 A1* | 11/2012 | Puura | H04L 51/38 455/410 |
| 2013/0007143 A1 | 1/2013 | Rinard et al. | |
| 2013/0007195 A1 | 1/2013 | Rinard et al. | |
| 2013/0014258 A1 | 1/2013 | Williams | |
| 2013/0054364 A1 | 2/2013 | Lyon | |
| 2013/0132589 A1 | 5/2013 | Erb et al. | |
| 2013/0159440 A1 | 6/2013 | Appelman | |
| 2013/0185051 A1* | 7/2013 | Buryak | G06F 40/58 704/2 |
| 2013/0191481 A1* | 7/2013 | Prevost | H04L 51/14 709/206 |
| 2013/0268839 A1 | 10/2013 | Lefebvre et al. | |
| 2014/0032683 A1 | 1/2014 | Maheshwari et al. | |
| 2014/0082108 A1 | 3/2014 | Naamani | |
| 2014/0122227 A1 | 5/2014 | Reinshagen et al. | |
| 2014/0156407 A1* | 6/2014 | Dinardo, Sr. | H04L 12/1859 705/14.56 |
| 2014/0164909 A1* | 6/2014 | Graff | G06F 16/957 715/234 |
| 2014/0173002 A1 | 6/2014 | Frederick | |
| 2014/0207877 A1* | 7/2014 | Kandaswamy | H04L 51/24 709/206 |
| 2014/0280453 A1 | 9/2014 | Mattison et al. | |
| 2014/0337697 A1 | 11/2014 | Ryu et al. | |
| 2014/0364082 A1* | 12/2014 | Baddeley | H04L 51/14 455/406 |
| 2015/0019654 A1 | 1/2015 | Wheeler et al. | |
| 2015/0058059 A1* | 2/2015 | Kahan | G06Q 10/1095 705/7.19 |
| 2015/0058235 A1* | 2/2015 | Kahan | G06Q 50/01 705/319 |
| 2015/0089602 A1* | 3/2015 | Murphy | G16H 70/20 726/4 |
| 2015/0100787 A1 | 4/2015 | Westin et al. | |
| 2015/0126151 A1* | 5/2015 | Madala | G06Q 50/01 455/411 |
| 2015/0149560 A1* | 5/2015 | Lee | H04L 51/066 709/206 |
| 2015/0154577 A1 | 6/2015 | Gargash | |
| 2015/0213372 A1* | 7/2015 | Shah | H04L 51/32 706/12 |
| 2015/0227879 A1* | 8/2015 | Bertanzetti | G06Q 10/063112 705/7.14 |
| 2015/0227901 A1* | 8/2015 | Bertanzetti | H04L 67/306 705/42 |
| 2015/0227902 A1* | 8/2015 | Bertanzetti | G06Q 20/384 705/42 |
| 2015/0278766 A1 | 10/2015 | Gune | |
| 2015/0286650 A1* | 10/2015 | Stump | G06Q 50/01 705/319 |
| 2015/0381533 A1 | 12/2015 | Klemm | |
| 2015/0381552 A1* | 12/2015 | Vijay | H04L 43/08 709/206 |
| 2016/0027092 A1* | 1/2016 | Farmer | H04L 12/4625 705/7.32 |
| 2016/0050166 A1 | 2/2016 | Smith et al. | |
| 2016/0063276 A1* | 3/2016 | Pycock | G06F 21/6245 726/28 |
| 2016/0071074 A1 | 3/2016 | Baird et al. | |
| 2016/0092039 A1* | 3/2016 | Chien | G06F 3/04886 715/752 |
| 2016/0119781 A1* | 4/2016 | Barry | H04L 63/123 726/4 |
| 2016/0125444 A1 | 5/2016 | Shaw | |
| 2016/0142505 A1 | 5/2016 | Kim et al. | |
| 2016/0198509 A1* | 7/2016 | Hayes, Jr. | G06Q 30/02 370/329 |
| 2016/0234267 A1 | 8/2016 | Hebbar et al. | |
| 2016/0253623 A1* | 9/2016 | Ruiz | G06Q 50/26 705/333 |
| 2016/0292967 A1 | 10/2016 | Chen et al. | |
| 2016/0371702 A1* | 12/2016 | Kim | G06Q 30/016 |
| 2017/0070465 A1* | 3/2017 | Gruver | H04L 41/0866 |
| 2017/0087462 A1 | 3/2017 | Eichstaedt et al. | |
| 2017/0104698 A1* | 4/2017 | Tomczyk | H04L 51/046 |
| 2017/0104708 A1* | 4/2017 | Reddy | H04L 51/20 |
| 2017/0149702 A1* | 5/2017 | Ruckert | H04L 51/36 |
| 2017/0316216 A1 | 11/2017 | Kim et al. | |
| 2018/0046984 A1 | 2/2018 | Brophy et al. | |
| 2018/0077106 A1 | 3/2018 | Skinner et al. | |

\* cited by examiner

```
┌─────────────────────────────────────────────┐
│   ACCESS MESSAGE RECIPIENT INFORMATION      │
│                                       402   │
└─────────────────────────────────────────────┘
                      ↓
┌─────────────────────────────────────────────┐
│   RECEIVE A REQUEST TO TRANSMIT A MESSAGE   │
│                                       404   │
└─────────────────────────────────────────────┘
                      ↓
┌─────────────────────────────────────────────┐
│ SELECT MESSAGING SERVICES FOR EACH MESSAGE RECIPIENT │
│                                       406   │
└─────────────────────────────────────────────┘
                      ↓
┌─────────────────────────────────────────────┐
│ GENERATE A MESSAGE FOR EACH SELECTED MESSAGING SERVICE │
│                                       408   │
└─────────────────────────────────────────────┘
                      ↓
┌─────────────────────────────────────────────┐
│ TRANSMIT USER ACCOUNT INFORMATION AND GENERATED MESSAGES │
│        TO EACH SELECTED MESSAGING SERVICE   │
│                                       410   │
└─────────────────────────────────────────────┘
```

MANAGING MESSAGING SERVICES

CROSS-REFERENCE TO RELATED APPLICATION

This application is a divisional of U.S. application Ser. No. 14/947,138, filed Nov. 20, 2015, now allowed, which is incorporated by reference in its entirety.

TECHNICAL FIELD

This disclosure generally relates to messaging services.

BACKGROUND

In recent years, mobile devices and social networks have changed the way that people communicate and interact with one another. As such, many companies have started to utilize mobile communication and social networking services as channels for communicating with existing and potential customers. With new services being regularly released and existing services regularly losing popularity amongst users, this scene is, however, in a constant state of change. As a result, it has become increasingly more difficult for companies to keep abreast of the mobile communication and social networking services being used by existing and potential customers at any given time.

SUMMARY

In general, an aspect of the subject matter described in this specification may involve a process for managing the messaging services through which messages from an entity, such as a company, are communicated to various users. This capability may be provided by a messaging management service that keeps track of such messaging services and provides messages to users through these messaging services on behalf of various companies. In this way, the messaging management service may enable companies to quickly establish a presence on new communication platforms and more easily communicate through the mobile communication and social networking services that are most suitable to their existing and potential customers.

In some aspects, the subject matter described in this specification may be embodied in methods that may include the actions of accessing, by a messaging management service, message recipient information that includes, for each of multiple message recipients, (i) preference data identifying one or more messaging services through which messages are to be sent to a user, and, (ii) for each of the messaging services through which messages are to be sent to the user, account information for the user, and receiving, by the messaging management service and from a message initiator, a request to transmit a message, where the request includes at least (i) a message content type identifier that indicates a type of message that is to be transmitted, and (ii) data identifying one or more message recipients. Such methods that may further include the actions of, for each message recipient, selecting, by the messaging management service, one or more particular messaging services based on the preference data for the message recipient, and, for each of the particular messaging services, generating, by the messaging management service, a message based on the message content type identifier, transmitting, by the messaging management service, the message and the account information for the user to the messaging service, and in response to transmitting the message, receiving, by the messaging management service, an acknowledgement from the messaging service. Such methods that may further include the actions of generating, by the messaging management service, a response to the request based on at least one of the one or more acknowledgements, and transmitting, by the messaging management service and to the message initiator, the response to the request.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, implementations may include the one or more particular messaging services including one or more social networking services. In some implementations, the request may further include (iii) a set of content that is to be included in the message that is to be transmitted. In these implementations, generating the message based on the message content type identifier may, for instance, include selecting, from among multiple templates that are each associated with different message content type identifiers, a particular template that is associated with the received message content type identifier, and populating the particular template with the set of content. In addition, the multiple templates may, in some examples, be maintained by one or more administrators associated with the message initiator.

In some implementations, the preference data may further identify a language in which messages are to be provided to the user. In some examples, receiving, by the messaging management service and from the message initiator, the request to transmit the message may, for instance, include receiving, by the messaging management service and from the message initiator, a request (i) under a simple object access protocol and (ii) to transmit a message.

In some examples, accessing, by the messaging management service, message recipient information may include accessing, by the messaging management service, message recipient information for each of multiple users that are registered to receive messages on behalf of the message initiator. In such implementations, at least a portion of the message recipient information for each of the multiple users may, for instance, be obtained in through one or more processes through which each user is registered to receive messages on behalf of the message initiator. In one aspect, the one or more processes through which each user is registered to receive messages on behalf of the message initiator are performed, at least in part, by one or more computing devices that host a website associated with the message initiator.

In some implementations, selecting one or more particular messaging services based on the preference data for the message recipient may include, for each of one or more message recipients, selecting, by the messaging management service, two or more particular messaging services based on the preference data for the message recipient. In such implementations, generating the message based on the message content type identifier may include, for each of the two or more particular messaging services, generating, by the messaging management service, a message based on the message content type identifier that is formatted for the respective one of the two or more particular messaging services.

In some examples, generating the message based on the message content type identifier may include selecting, from among multiple templates that are each associated with different message content type identifiers and maintained by one or more administrators through a web administration console of the messaging management service, a particular template that is associated with the received message content type identifier, and populating the particular template with the set of content. The web administration console of the messaging management service may, in some instances, enable templates to be added and modified by the one or more administrators.

In some aspects, the subject matter described in this specification may be embodied in methods that may include the actions of accessing, by a messaging management service, message recipient information that includes, for each of multiple message recipients, (i) preference data identifying one or more existing messaging services through which messages are to be sent to a user, and, (ii) for each of the existing messaging services through which messages are to be sent to the user, account information for the user, receiving, by the messaging management service, new messaging service provisioning information for a new messaging service, where the new messaging service provisioning information includes (i) information that associates message content type identifiers to message templates that are formatted for the messaging service, and (ii) instructions for electronically communicating messages to the new messaging service, transmitting, by the messaging management service and to one or more message initiators, a notification indicating that messages may now be transmitted through the new messaging service, and receiving, by the messaging management service and from one or more of the message initiators, updated message recipient information that includes, for each of one or more of the multiple message recipients, (i) updated preference data identifying the new messaging service, and, (ii) account information for the new messaging service and the user.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, receiving, by the messaging management service and from one or more of the message initiators, updated message recipient information may, in some implementations, include receiving, by the messaging management service and from one or more of the message initiators, updated message recipient information based on an indication that the user would like receive messages through the new messaging service. In some examples, the indication that the user would like receive messages through the new messaging service is received by the message initiator through a website associated with the message initiator.

In some implementations, such methods that may further include the actions of receiving, by the messaging management service, one or more updates to enable the messaging management service to generate messages that are compatible with the new messaging service. In some examples, such methods that may further include the actions of updating the message recipient information for each of the one or more of the multiple message recipients, to reflect the (i) updated preference data identifying the new messaging service, and, (ii) account information for the new messaging service and the user.

In some aspects, the subject matter described in this specification may be embodied in methods that may include the actions of receiving, by a message initiator, an indication that a particular message recipient has initiated communication of a message through a particular messaging service, determining, by the message initiator, that message recipient information for the particular message recipient indicates that messages are not to be transmitted to the particular message recipient through the particular messaging service, in response to determining that the message recipient information for the particular message recipient indicates that the messages are not to be sent to the particular message recipient through the particular messaging service, providing, by the message initiator, a prompt for the particular message recipient to confirm that the message is to be transmitted through the particular messaging service; receiving, by the message initiator, a response from the particular message recipient confirming that the message is to be transmitted through the particular messaging service, and in response to receiving the response from the particular message recipient confirming that the message is to be transmitted through the particular messaging service, transmitting, to a messaging management service, a request to transmit a message, where the request includes at least (i) a message content type identifier that indicates a type of the message that is to be transmitted, (ii) data identifying the particular message recipient, and (iii) data indicating that the particular message recipient has overridden preference data indicating that messages are not to be transmitted to the particular message recipient through the particular messaging service.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, providing, by the message initiator, the prompt for the particular message recipient to confirm that the message is to be transmitted through the particular messaging service may, in some implementations, include providing, by the message initiator and through an interface of a website associated with the message initiator, a prompt for the particular message recipient to confirm that the message is to be transmitted through the particular messaging service. In these implementations, receiving, by the message initiator, the response from the particular message recipient confirming that the message is to be transmitted through the particular messaging service may include receiving, by the message initiator and through the interface of the website associated with the message initiator, a response from the particular message recipient confirming that the message is to be transmitted through the particular messaging service. In some examples, the particular messaging service is a social networking service. In addition, the request may, in some examples, further include (iv) a set of content that is to be included in the message that is to be transmitted.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
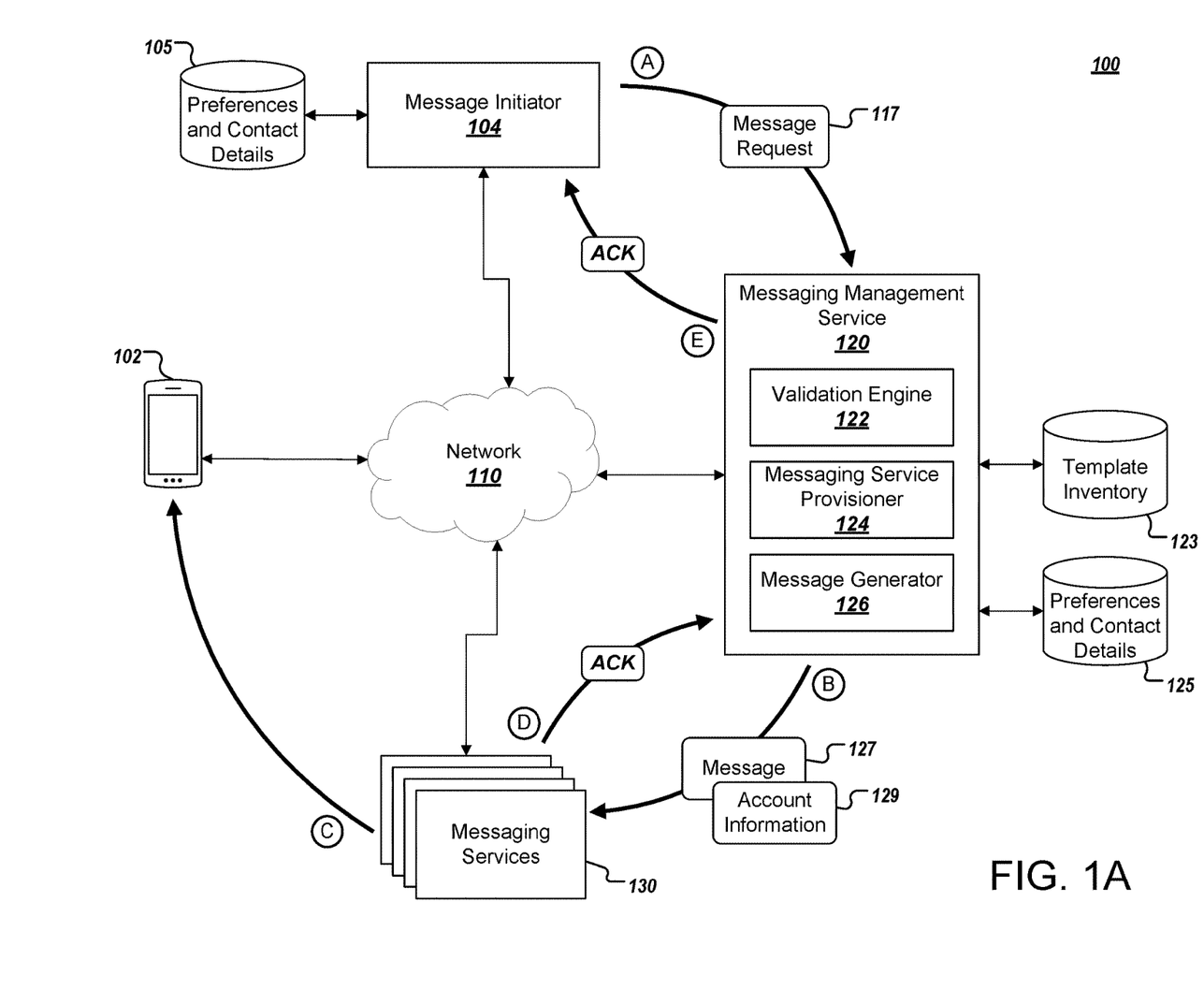
FIGS. 1A-B are conceptual diagrams of an exemplary framework for managing messages on behalf of one or more message initiators.

FIG. 1 is a conceptual diagram of an exemplary framework for managing messages on behalf of one or more message initiators in a system 100. More particularly, the diagram depicts a client device 102, a message initiator 104, a messaging management service 120, and messaging services 130 that collectively make up system 100. The diagram also depicts exemplary data that is communicated within system 100 in time-sequenced stages "A" to "E," respectively. Briefly, and as described in further detail below, the client device 102 may receive messages through messaging services 130 that are sent by the messaging management service 120 on behalf of the message initiator 104.

The client device 102, message initiator 104, messaging management service 120, and messaging services 130 may communicate with one another over network 110, and may each be implemented using, for example, one or more general-purpose computers capable of responding to and executing instructions in a defined manner, personal computers, special-purpose computers, workstations, servers, or mobile devices. The system 100 may include multiple message initiators, but may be described with reference to message initiator 104 for exemplary purposes. Similarly, the system 100 may include multiple client devices, but may be described with reference to client device 102 exemplary purposes.

In this example, the message initiator 104 may include one or more computing devices that are associated with one or more subscribers of the messaging management service 120. A subscriber may, for instance, correspond to a company, a group, and/or an individual that leverages the messaging management service 120 to communicate with customers, group members, and the like. A user of client device 102 may, for instance, receive messages provided by messaging management service 120 on behalf of subscribing companies and/or groups of which the user of client device 102 is a customer or member.

The messaging services 130 may include communication and social networking services for which the user of client device 102 holds an account. The messaging services 130 may, for example, include social networking services, e-mail services, image sharing services, SMS or other text-messaging services, mobile chat services, video conferencing services, and the like. In some examples, the user of client device 102 may register with a company or group that subscribes to the messaging management service 120 to receive messages through such messaging services 130. For instance, the user of client device 102 may sign up to receive these messages through a company's website. Information such as user preferences and messaging account details may be provided to the company by the user of client device 102 in this registration process. This information may be received by or otherwise made accessible to the message initiator 104 and stored in a preferences and contact details database 105. In addition, the message initiator 104 may pass some or all of this information along to messaging management service 120, which may in turn store such information in a preferences and contact details database 125. In implementations in which registration is performed through use of a website, the message initiator 104 may include or operate in cooperation with one or more servers hosting the website.

The messaging management service 120 may include a validation engine 122, a messaging service provisioner 124, and a message generator 126. The functionality of each module included in the messaging management service 120 is described in more detail below. The messaging management service 120 may further include a web administration console through which subscribers may interact with the messaging management service 120 to define the types of messages that may be sent to users. Various message templates of the subscriber's specifications may be stored in a template inventory 123 and later accessed by the messaging management service 120 to generate messages in response to a subscriber's requests. The messaging management service 120 may further transmit these generated messages to a particular subset of messaging services 130 for deliver to an end user. In addition, the messaging management service 120 may leverage messaging service provisioner 124 to provision each of the messaging services 130 for use as channels through which subscribers of the messaging management service 120 may communicate with end users.

The user of client device 102 may sign up to be provided with messages, such as reminders and other notifications, in response to satisfaction of one or more conditions. For example, the user of client device 102 may wish to be provided with a reminder message fourteen days prior to the expiration of their contract with the company. In another example, the user of client device 102 may wish to be provided with a notification when the stock of a particular product sold by the company is replenished. These conditions may be indicated by information included in the preferences and contact details 105 and monitored by the message initiator 104.

In stage A, the message initiator 104 may send a message request 117 to the messaging service 120. Message request 117 may, for example, be sent in response to the satisfaction of one or more conditions that are being monitored by the message initiator 104. For example, the message initiator 104 may, in stage A, determine that a contract between the company and the user of client device 102 is set to expire in fourteen days, based at least on information stored in the preferences and contact details database 105. In particular, the message request 117 may include a message content type identifier that indicates a type of message that is to be transmitted and data identifying one or more message recipients. A content type identifier may correspond to one or more message templates as defined by one or more subscribers of the messaging management service 120 that are associated with message initiator 104. In the example of FIG. 1A, the type of message that is to be transmitted as indicated by the content type identifier included in the message request 117 may correspond to a reminder about expiration of a contract. Similarly, the data identifying one or more message recipients that is included in the message request 117 may, in this example, identify the user of client device 102 as a message recipient.

In some implementations, the messaging management service 120 may leverage the validation engine 122 to perform one or more validation processes upon the message request 117. Such validation processes may, for example, include those which conform to a simple object access protocol ("SOAP"). The messaging management service 120 may provide results output by the validation engine 122 to message initiator 117 upon completion of such validation processes. In some implementations, the messaging management service 120 may not perform the processes described below unless message request 117 is successfully validated by the validation engine 122.

After receiving message request 117, the messaging management service 120 may utilize the data identifying the user of client device 102, as included in the message request 117, to retrieve information associated with the user of client device 102 that is stored in preferences and contact details database 125. Such information may include preference data identifying one or more of messaging services 130 through which messages are to be sent to the user of client device 102 and, for each of these one or more messaging services 130, account information for the user of client device 102. That is, the messaging management service 120 may determine which of messaging services 130 are to be utilized to reach the user of client device 102, as well as the details of the accounts that the user of client device 102 holds with each of these messaging services 130. In this way, the message initiator 104 may not need to directly include information about which messaging services to use in the message request 117 that it transmits to the messaging management service 120. It can be noted that, by performing such information retrieval processes, the messaging management service 120 allows the message initiator 104 to perform relatively little work to broadcast messages to its users.

For example, the user of client device 102 may have signed up to reminders about expiration of their contract with the company associated with message initiator 104 through a social network service, an e-mail service, and an image sharing service. In this example, the messaging management service 120 may identify the particular social network service, e-mail service, and image sharing service from among the messaging services 130, and further identify account information for each of these services that corresponds to the user of the client device 102.

In addition, the messaging management service 120 may utilize the message content type identifier that indicates the type of message that is to be transmitted, as included in the message request 117, to retrieve a message template from the template inventory 123 for each respective one of the messaging services 130 that are determined to be utilized to reach the user of client device 102. Each message template included in the template inventory 123 may be stored in association with a message content type identifier and data identifying the particular one of messaging services 130 for which the respective message is formatted. It can be seen that the information included in the message request 117 and preferences and contact details 125 may enable the messaging management service 120 to identify and retrieve message templates from the template inventory 123 of an appropriate type and format. In the example mentioned above, the messaging management service 120 may retrieve contract expiration reminder templates from the template inventory 123 that are formatted for the particular social network service, e-mail service, and image sharing service identified by the messaging management service 120 for the user of client device 102.

Upon retrieving the appropriate message templates in response to receiving message request 117, the messaging management service 120 may leverage message generator 126 to generate a message based on each of the retrieved message templates. The message generator 126 may include a dedicated sub-module for each one of messaging services 130 that generates messages formatted for the respective messaging service. In some examples, these sub-modules may be invoked by the messaging management services 120 in a dynamic manner using Java reflection. In some examples, the message generator 126 may generate messages by populating each retrieved message template with content or otherwise generating a message including such content based on each retrieved message template to include additional information. The messaging management service 120 may, for example, obtain such content based on information included in the message request 117, preferences and contact details database 125, template inventory 123, or a combination thereof.

Figure 1B:
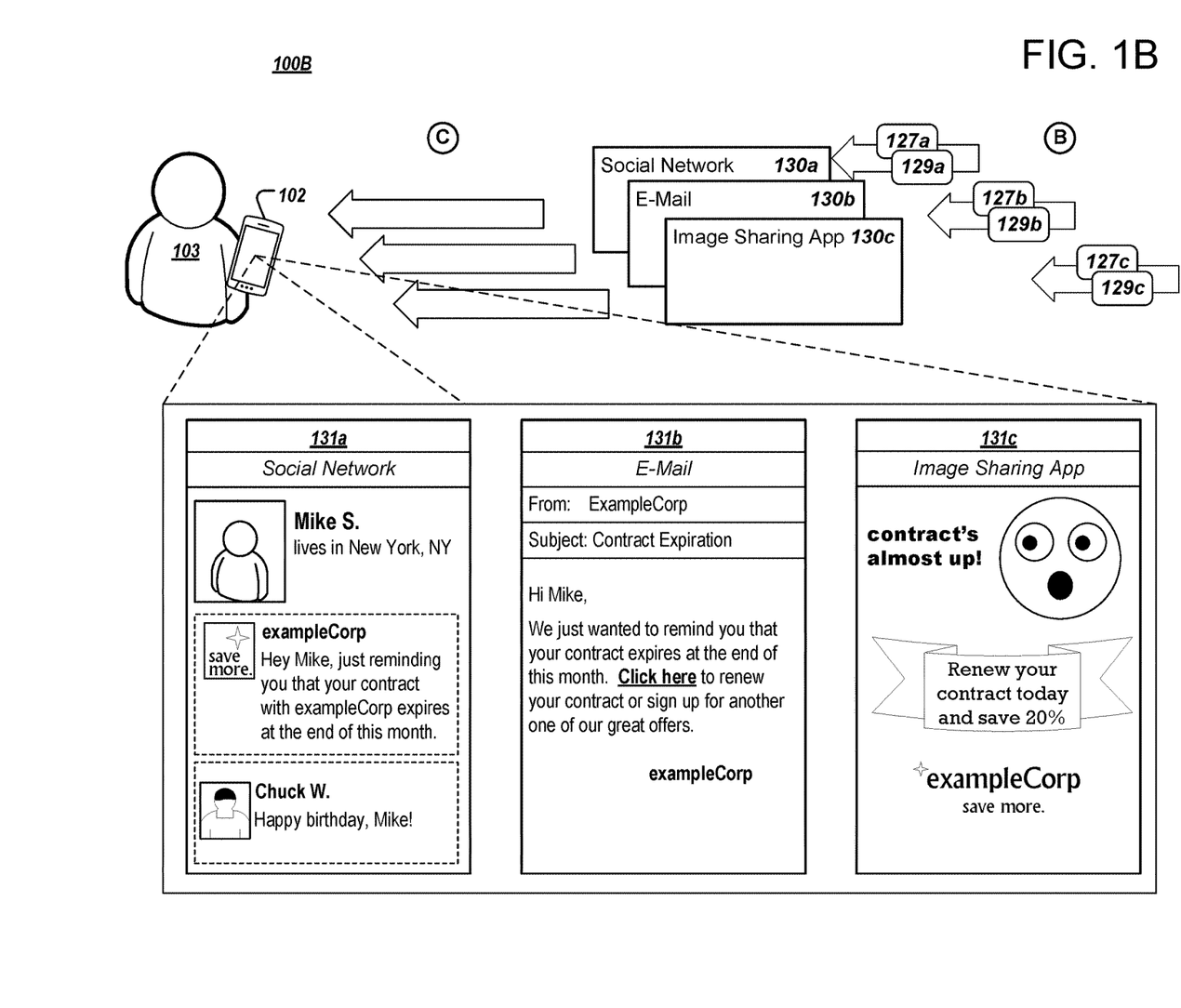

In stage B, the messaging management service 120 may transmit each message 127 that is has generated, along account information 129 that corresponds to the user of the client device 102 to each identified one of messaging services 130. FIG. 1B is a conceptual diagram of an exemplary framework for managing messages on behalf of one or more message initiators in a system 100B. The system 100B may, for example, represent system 100 as described in association with FIG. 1A or a portion thereof. In the example of FIG. 1B, a user 103 may correspond to the user of client device 102, and a social networking service 130*a*, an e-mail service 130*b*, and an image sharing service 130*c* may correspond to the subset of messaging services 130 through which user 103 desires to receive reminders about expiration of their contract with a company, "exampleCorp" that subscribes to the messaging management service 120 and is associated with message initiator 104.

Referring now to FIG. 1B, it can be seen that, in stage B, the social network service 130*a*, e-mail service 130*b*, and image sharing service 130*c* are provided with messages 127*a*, 127*b*, and 127*a* and account information 129*a*, 129*b*, and 129*a*, respectively. Such messages 127*a-c* and account information 129*a-c* may correspond to that which is transmitted by messaging management service 120 in stage B. In this example, messages 127*a*, 127*b*, and 128*c* may have been generated by sub-modules included in the message generator 126 dedicated to the social networking service 130*a*, the e-mail service 130*b*, and the image sharing service 130*c*, respectively. In some implementations, the account information 129 provided to each messaging service may further include details of one or more accounts held by the one or more subscribers associated with the message initiator 104.

In some examples, the contents of messages 127a-c and account information 129a-c may cause each messaging service to send, post, or otherwise make each generated message to available to user 103. In stage C, messages generated and sent by messaging management service 120 on behalf of exampleCorp may be provided to user 103. For example, the message 127a and account information 129a provided to the social network service 130a by the messaging management service 120 may cause the social network service 130a to post a message on behalf of exampleCorp to the wall of an account associated with user 103. The user 103 may then be able to view this wall post by accessing the social networking service 130a through a web browser or an application running on the client device 102, one or more other computing devices, or a combination thereof. For instance, the client device 102 may display screen 131a when the user 103 accesses the wall associated with their account for social networking service 130a. By further including details of exampleCorp's account for social networking service 130a, the message posted on the wall of user 103 may appear to have been sent by exampleCorp.

The message shown within display screen 131a may reflect the message generated by message generator 126 using a message template stored in template inventory 123 for a contract expiration reminder formatted for the social networking service 130a. Such a message template may, for example, have been defined by one or more users associated with exampleCorp through the web administration console of the messaging management service 120 and may correspond to the content type identifier included in the message request 117. More particularly, this message may reflect that which was generated by the sub-module included in message generator 126 that corresponds to the social networking service 130a. The resulting message posted on the wall of user 103 may, for instance, include text that says "Hi Mike, just reminding you that your contract with exampleCorp expires at the end of this month."

In this instance, the message template may have been that of a wall posting that includes strings of characters and variable objects that are to be replaced with content that is relevant to user 103, exampleCorp, one or more conditions whose satisfaction triggered message request 117, or a combination thereof. For example, portions of the message posted on the wall of user 103 such as (i) "Mike," (ii) "exampleCorp," and (iii) "at the end of this month" may represent content that was used to replace three different variable objects in the message template for a contract expiration reminder formatted for the social networking service 130a that serve as placeholders for (I) the name of user to which the message is being sent, (II) the name of the entity that has requested that the message be sent, and (III) the date on which the user's contract expires. The dedicated sub-module included in message generator 126 that corresponds to the social networking service 130a may perform one or more operations to identify and obtain the content that is appropriate for each message. In some implementations, such content may be associated with information included in message request 117. In these implementations, the messaging management service 120 may obtain content from one or more web resources, databases, or other computing devices on the basis of information included in message request 117. In other implementations, such content may be included in message request 117.

In another example, the message 127b and account information 129b provided to the e-mail service 130b by the messaging management service 120 may cause an e-mail to be sent to the e-mail account of user 103 on behalf of exampleCorp to the wall of an account associated with user 103. The user 103 may then be able to view this e-mail message by accessing the e-mail service 130b through a web browser or an application running on the client device 102, one or more other computing devices, or a combination thereof. For instance, the client device 102 may display screen 131b when the user 103 accesses their account for the e-mail service 130b. By further including details of exampleCorp's e-mail account, the message e-mailed to user 103 may appear to have been sent by exampleCorp.

The message shown within display screen 131b may reflect the message generated by message generator 126 using a message template stored in template inventory 123 for a contract expiration reminder formatted for the e-mail service 130b. Such a message template may, for example, have been defined by one or more users associated with exampleCorp through the web administration console of the messaging management service 120. Like the message template described above in reference to display screen 131a, this message template may also correspond to the content type identifier included in the message request 117. More particularly, this message may reflect that which was generated by the sub-module included in message generator 126 that corresponds to the e-mail service 130b. The resulting e-mail message sent to user 103 may, for instance, include text that says "Hi Mike," "We just wanted to remind you that your contract expires at the end of this month," "Click here to renew your contract or sign up for another one of our great offers," and may be signed "exampleCorp."

In this instance, the message template may have been that of an email that includes strings of characters and variable objects that are to be replaced with content that is relevant to user 103, exampleCorp, one or more conditions whose satisfaction triggered message request 117, or a combination thereof. Portions of this e-mail message may be identified and obtained in a manner similar to that which has been described above in association with display screen 131a. In addition, the dedicated sub-module included in message generator 126 that corresponds to the e-mail service 130b may perform one or more operations to augment the "Click here" text with a particular hyperlink. In this example, the message generated by messaging management service 120 may link the "Click here" text to a particular page of exampleCorp's website. The uniform resource locator ("URL") for this page may be identified and obtained using one or more of the techniques described above.

In yet another example, the message 127c and account information 129c provided to the image sharing service 130c by the messaging management service 120 may cause the image sharing service 130c to share an image conveying a message on behalf of exampleCorp with an account associated with user 103. The user 103 may then be able to view the image that has been shared with them by accessing the image sharing service 130c through a web browser or an application running on the client device 102, one or more other computing devices, or a combination thereof. For instance, the client device 102 may display screen 131c when the user 103 accesses their account for image sharing service 130c. By further including details of exampleCorp's account for image sharing service 130c, it may appear as though exampleCorp has shared the image with user 103.

The image shown within display screen 131c may reflect the message generated by message generator 126 using a message template stored in template inventory 123 for a contract expiration reminder formatted for the image sharing service 130c. Such a message template may, for example, have been defined by one or more users associated with exampleCorp through the web administration console of the messaging management service 120. Like the message template described above in reference to display screens 131a and 131b, this message template may also correspond to the content type identifier included in the message request 117. More particularly, this image may reflect a message generated by the sub-module included in message generator 126 that corresponds to the image sharing service 130c. The resulting image shared with user 103 may, for instance, include graphics of text that say "contract's almost up," "Renew your contract today and save 20%," and "exampleCorp," "save more." In addition, the image shared with user 103 may further include other non-textual graphics such as emoticons and other icons.

In this instance, the message template may have been that of an image that includes graphics and variable graphical objects that are to be replaced with graphics that are relevant to user 103, exampleCorp, one or more conditions whose satisfaction triggered message request 117, or a combination thereof. Graphics included in this message may be identified and obtained in a manner similar to that which has been described above in association with display screens 131a and 131b.

Each of the messaging services may provide the messaging management service 120 with acknowledgement of the respective message having been successfully received by the messaging service and/or provided for user 103. In the event that the respective message is not successfully received by the messaging service and/or provided for user 103, each messaging service may instead provide the messaging management service 120 with a negative-acknowledgement. Referring again to FIG. 1A, it can be seen that such acknowledgements are provided to the messaging management service 120 by messaging services 130 in stage D. The messaging management service 120 may, in turn, provide data indicating such acknowledgements to the message initiator in stage E. These acknowledgement and negative-acknowledgement messages may serve to alert messaging management service 120 and/or message initiator 104 to any errors that might have occurred in providing messages. In some examples, one or more computing devices of system 100 may take corrective measures in the presence of negative-acknowledgement messages to resolve outstanding issues and again attempt to successfully provide messages.

In some implementations, the client device 102 may include a mobile computing device, personal digital assistant, cellular telephone, smart-phone, tablet, laptop, desktop, workstation, and other computing devices. The client device 102 accesses the network 110 using a wireless connection, such as a cellular telephone data connection, a Wi-Fi connection, or other wireless connection that can be used for sending data to and receiving data from message initiator 104 and messaging services 130. In addition, the message initiator 104, messaging management service 120, and/or messaging services 130 may rely upon one or more remotely-located devices such as servers, databases, and/or cloud computing devices to perform at least a portion of its functions as described herein.

In some implementations, the network 110 includes one or more networks, such as a local area network, a wide area network, and/or the Internet. One or more of the networks in the network 110 may be wireless, such as a cellular telephone network or a Wi-Fi network.

Figure 2:
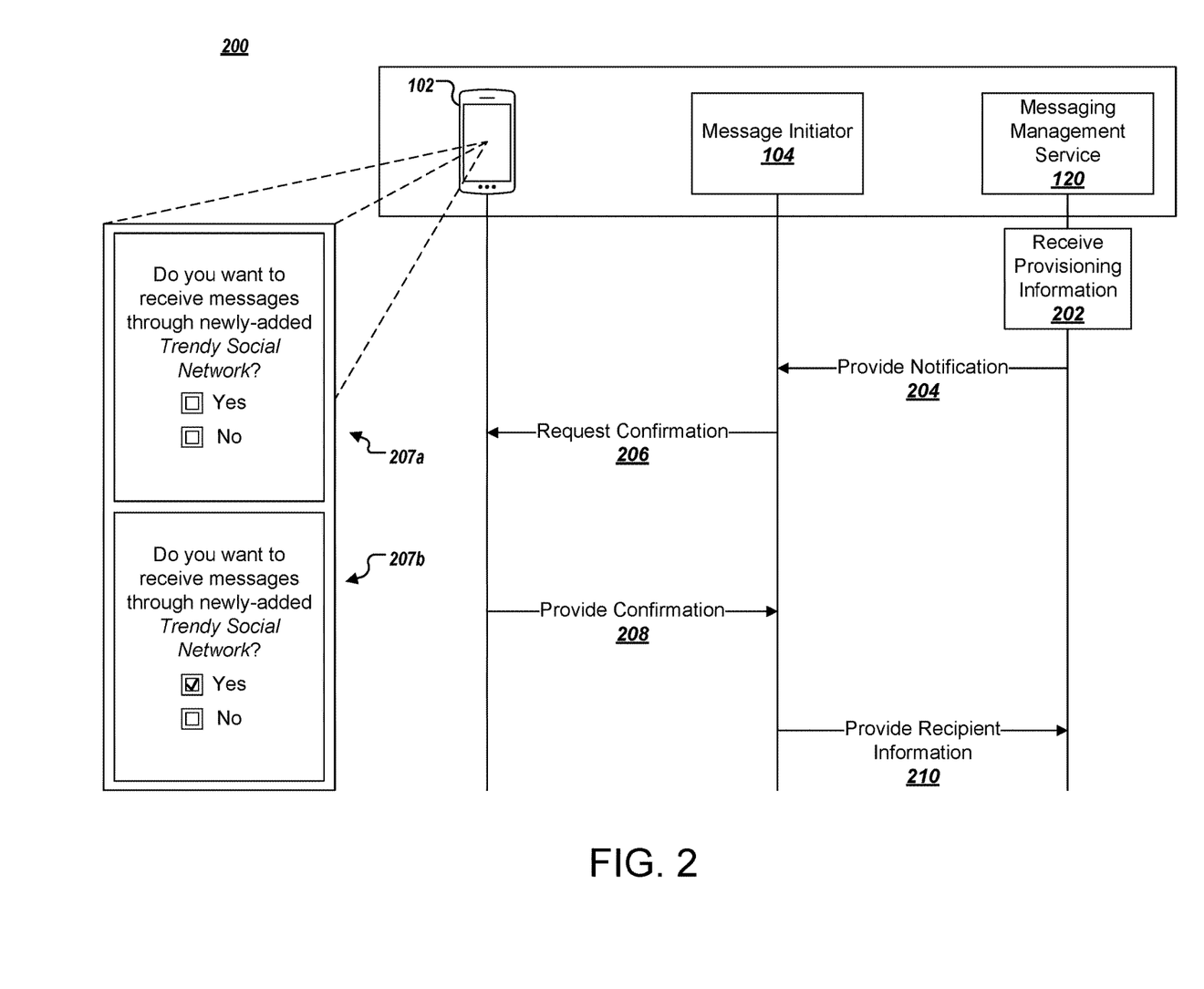
FIG. 2 illustrates an example of a sequence in which a messaging service is provisioned as a service through which messages are sent to recipients on behalf of one or more message initiators.

FIG. 2 illustrates an example of a sequence 200 in which a messaging service is provisioned as a service through which messages are sent to recipients on behalf of one or more message initiators. The following describes the processes of sequence 200 as being performed by components of systems that are described with reference to FIGS. 1A-B. However, the processes of sequence 200 may be performed by other systems or system configurations. At 202, the messaging management service 120 receives provisioning information for a new messaging service. For example, the messaging management service 120 may be provided with a new sub-module that generates messages to be transmitted through a new messaging service. This may, for instance, be a mobile communication or social networking service that was recently released or gained popularity. The messaging service provisioner 124 may, for instance, perform some or all of the operations described herein in association with provisioning the new messaging service.

The messaging management service 120 may, at 202, receive new message provisioning information that associates message content type identifiers to message templates that are formatted for the new messaging service and instructions for electronically communicating messages to the new messaging service. Following the example provided above in reference to FIGS. 1A-B, this information may, for instance, include that which associates the content type identifier for a contract expiration reminder with a particular message template that this formatted for the new messaging service. One or more message templates formatted for the new messaging service may be added to template inventory 125 in conjunction with the new messaging service provisioning information being received by the messaging management service 120. In some implementations, the new messaging service provisioning information, sub-module, and message templates may be provided to the messaging management service 120 by one or more administrators of the messaging management service 120.

At 204, the messaging management service 120 may transmit a notification to one or more message initiators 104 which indicates that messages may now be transmitted through the new messaging service. In this way, the messaging management service 120 may inform its subscribers of the newly-supported messaging service through which they may be able to communicate with end users. In some examples, the channel through which the messaging management service 120 and message initiator 104 communicate may be predetermined. In response to receiving this notification, each message initiator 104 may, at 206, request that each user that is registered to receive their messages confirm that they wish to also receive messages through the new messaging service. Such requests may, for instance, be provided to users through a website associated with each message initiator 104.

For instance, the client device 102 may display screen 207a when a registered user accesses a website associated with the corresponding message initiator 104. As shown within display screen 207a, the website associated with the corresponding message initiator 104 may prompt the user of client device 102 to indicate whether they would like to receive messages through the new messaging service supported by messaging management service 120. The client device 102 may, for example, display screen 207b when the registered user indicates whether they would like to receive messages through the new messaging service in response to the prompt.

At 208, the client device 102 may provide confirmation of whether the user of client device 102 wishes to receive messages through the new messaging service to messaging initiator 104. This may, for instance, occur upon submission of user indication to the website associated with the corresponding message initiator 104, as shown within display screen 207b. At 210, the message initiator 104 may provide recipient information to the messaging management service 120. Such recipient information may include updated recipient information for each of one or more of multiple message recipients. In the example of FIG. 2, this may at least include updated recipient information for the user of client device 102. Furthermore, the updated recipient information may include updated preference data identifying the new messaging service and account information for the new messaging service and the user. Although not shown in FIG. 2, the user of client device 120 may provide their preferences for receiving messages through the new messaging service details of an account held by the user of client device 120 with the new messaging service. This information may also be received through the website associated with the corresponding message initiator 104. Upon receiving the updated recipient information at 210, the messaging management service 120 may update the information maintained in the preferences and contact details database 125 for each registered user that has signed up to receive messages through the new messaging service.

In some implementations, the initial registration process that occurs between users and message initiators 104 may include processes that are similar to at least a portion of the processes of sequence 200. For instance, each user may provide their messaging preferences through a website associated with a message initiator 104 in a process similar to that which has been described above in reference to sequence 200 at 206 and 208. The preferences provided by each user may, for example, indicate the particular subset of messaging services through which the respective user wishes to receive messages, the language in which messages provided through each messaging service are to be written, dates and times at which the user wishes to be provided with messages, the types of messages that are to be provided through each messaging service, the conditions under which each type of message is to be provided through each messaging service, and the like. The account information provided by each user may, for example, indicate a username of the respective user for each messaging service and other information that indicates an address at which the respective user can be reached through each messaging service. For example, such other information may include an e-mail address, phone number, and/or geographical location associated with the respective user. Upon receiving the information described above in the registration process, the message initiator 104 may store such information in the preferences and contact details database 105. Similarly, the messaging management service 120 may store this information in the preferences and contact details database 105 upon receiving such information from the message initiator 104 in a process similar to that which has been described above in reference to sequence 200 at 210.

Figure 3:
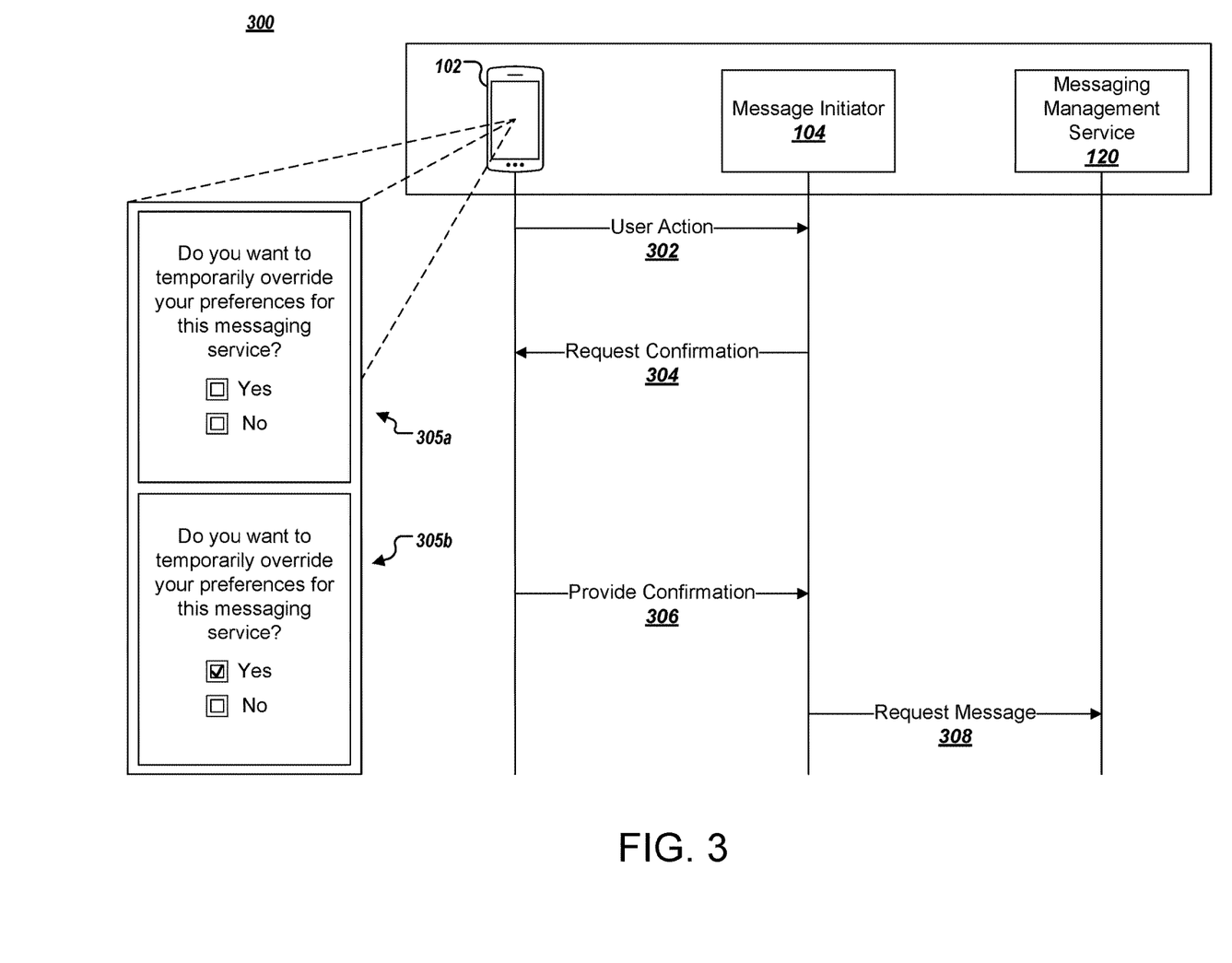
FIG. 3 illustrates an example of a sequence in which one or more messaging preferences are overridden.

FIG. 3 illustrates an example of a sequence 300 in which one or more messaging preferences are overridden. The following describes the processes of sequence 300 as being performed by components of systems that are described with reference to FIGS. 1A-B. However, the processes of sequence 300 may be performed by other systems or system configurations. At 302, the client device 102 may provide an indication that the user of client device 102 has initiated communication of a message through a particular messaging service. This may, for instance, be received by the message initiator 104 through an associated website. For instance, the user of client device 102 may order a product off of the website associated with message initiator 104 and indicate that they wish to be provided with a confirmation message for this purchase through a particular messaging service. The message initiator 104 may determine that existing message recipient information for the user of client device 102 indicates that messages are not to be transmitted to the user of client device 102 through the particular messaging service. For example, the message initiator 104 may reference existing information for the user of client device 102 that is stored in the preferences and contact details database 105 and determine that, in a previous registration process, the user of client device 102 explicitly indicated that they did not wish to receive messages through the particular messaging service.

At 304, the message initiator 104 may request that the user of client device 102 confirm that they wish to override their default preferences in order to receive the confirmation message through the particular messaging service. For instance, the client device 102 may display screen 305a as provided by the website associated with the message initiator 104 in response to determining that the message recipient information for the particular message recipient indicates that messages are not to be sent to the particular messaging recipient through the particular messaging service. As shown within display screen 305a, the website associated with the corresponding message initiator 104 may prompt the user of client device 102 to indicate whether they would like to override their existing messaging preferences. The client device 102 may, for example, display screen 305b when the user of client device 102 indicates whether they wish to override such existing messaging preferences.

At 306, the client device 102 may provide confirmation of whether the user of client device 102 wishes to override their existing messaging preferences to the message initiator 104. This may, for instance, occur upon submission of user indication to the website associated with the corresponding message initiator 104, as shown within display screen 305b. At 308, the message initiator 104 may provide a message request to the messaging management service 120. Such a message request may be similar to that which has been described above in association with message request 117, and may include a message content type identifier that indicates a type of the message that is to be transmitted, data identifying the particular message recipient, and data indicating that the particular message recipient has overridden preference data indicating that messages are not to be transmitted to the particular message recipient through the particular messaging service. The messaging management service 120 may, for instance, respond to this message request in a manner similar to that which has been described above in association with FIGS. 1A and 1B. The messaging management service 120 may, however, temporarily disregard the information stored in preferences and contact details database 125 pertaining to the preferences of the user of client device 102 with regard to the particular messaging service based on the data indicating that the particular message recipient has overridden preference data as included in the message provided at 308 by the message initiator 104. The messaging management service 120 may further rely upon such data to identify the particular message template stored in template inventory 123 that is formatted for the particular messaging service and that corresponds to the content type identifier provided in the message sent by the message initiator 104. The messaging management service 120 may then proceed to retrieve the particular message template, generate a message, and transmit the generated message to the particular messaging service in a manner similar to that which has been described above in reference to FIGS. 1A and 1B. Following the example mentioned above, the generated message may, for instance, be that of a confirmation message for the purchase made by the user of client device 102 through the website associated with message initiator 104.

Figure 4:
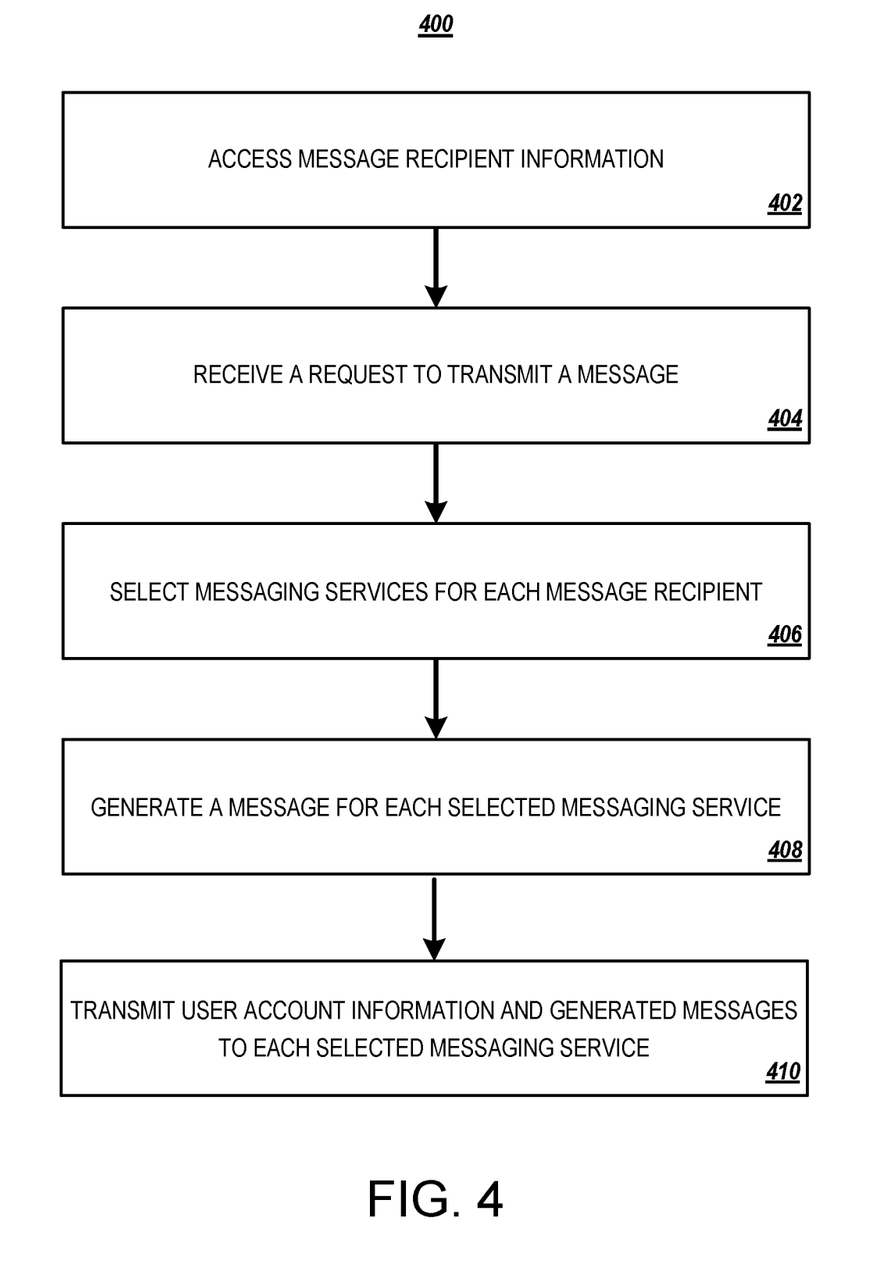
FIG. 4 is a flow chart of an example process for managing messages on behalf of one or more message initiators.

FIG. 4 is a flowchart of an example process 400 for managing messages on behalf of one or more message initiators. The following describes the process 400 as being performed by components of systems that are described with reference to FIGS. 1A and 1B. However, process 400 may be performed by other systems or system configurations.

The process 400 may include accessing, by a messaging management service, message recipient information that includes, for each of multiple message recipients, (i) preference data identifying one or more messaging services through which messages are to be sent to the user, and, (ii) for each of the messaging services through which messages are to be sent to the user, account information for the user (402). This may, for instance, correspond to the messaging management service 120 accessing or maintaining information stored in the preferences and contact details database 125. The messaging services through which recipients may be provided messages may include social networking services, e-mail services, image sharing services, SMS or other text-messaging services, mobile chat services, video conferencing services, other messaging services that have yet to be released, and the like.

The process 400 may include receiving, by the messaging management service and from a message initiator, a request to transmit a message, where the request includes at least (i) a message content type identifier that indicates a type of message that is to be transmitted, and (ii) data identifying one or more message recipients (404). This may, for instance, correspond to the messaging management service 120, in stage A, receiving message request 117 from a message initiator 104 in response to the satisfaction of one or more conditions that are monitored by the message initiator 104. In some examples, this request may further include (iii) a set of content that is to be included in the message that is to be transmitted. The message request provided by the message initiator 104 may further indicate that messages are to be sent to other recipients in addition to the user of client device 102. In some implementations, the request to transmit the message may be sent from the message initiator and received by the messaging management service under a simple object access protocol ("SOAP"). In such implementations, the messaging management service may perform one or more SOAP validation processes upon the request to transmit the message and exchange data pertaining to results of the SOAP validation processes with the message initiator.

The process 400 may include, for each message recipient, selecting, by the messaging management service, one or more particular messaging services based on the preference data for the message recipient (406). This may, for instance, correspond to the messaging management service 120 identifying or selecting a particular subset of messaging service 130 through which messages are to be sent to each recipient. In the example of FIG. 1B, this may correspond to the messaging management service 120 identifying or selecting social networking service 130a, e-mail service 130b, and image sharing service 130c from among the messaging services 130 that have been provisioned by messaging management service 120.

The process 400 may include, for each particular messaging service, generating, by the messaging management service, a message based on the message content type identifier (408). This may, for instance, correspond to the message generator 126 of messaging management service 120 generating a message to provide to each selected messaging service based on a respective message template retrieved from template inventory 125 based at least on message request 117. Messages for each particular messaging service may, for example, be generated by a respective sub-module included in the message generator 126.

In some implementations, generating the message based on the message content type identifier may include selecting, from among multiple templates that are each associated with different message content type identifiers, a particular template that is associated with the received message content type identifier, and populating the particular template with the set of content. In some examples, the multiple templates are maintained by one or more administrators associated with the message initiator. This may, for instance, correspond to one or more users associated with the message initiator 104 interfacing with the messaging management service 120 through the web administration console.

The process 400 may include, for each particular messaging service, transmitting, by the messaging management service, the message and the account information for the user to the messaging service (410). This may, for instance, correspond to the messaging management service 120 providing a message 127 and account information 129 to each particular messaging service in stage B. In the example of FIG. 1B, this may correspond to the messaging management service 120 providing messages 127a-c and account information 129a-c to social networking service 130a, e-mail service 130b, and image sharing service 130c, respectively. The messaging management service 120 may perform such processes for each of multiple recipients, for each of multiple message initiators.

In some implementations, the process 400 may further include, in response to transmitting the message, receiving, by the messaging management service, an acknowledgement from the messaging service. This may, for instance, correspond to the messaging management service 120 receiving one or more acknowledgements or negative-acknowledgments from the each one of messaging services 130 to which it has provided a generated message in stage C.

In some implementations, the process 400 may further include generating, by the messaging management service, a response to the request based on at least one of the one or more acknowledgements, and transmitting, by the messaging management service and to the message initiator, the response to the request. This may, for instance, correspond to the messaging management service 120 generating a response to message request 117 based on the one or more acknowledgements it received in stage D, and transmitting the response to message initiator 104 in stage E.

Figure 5:
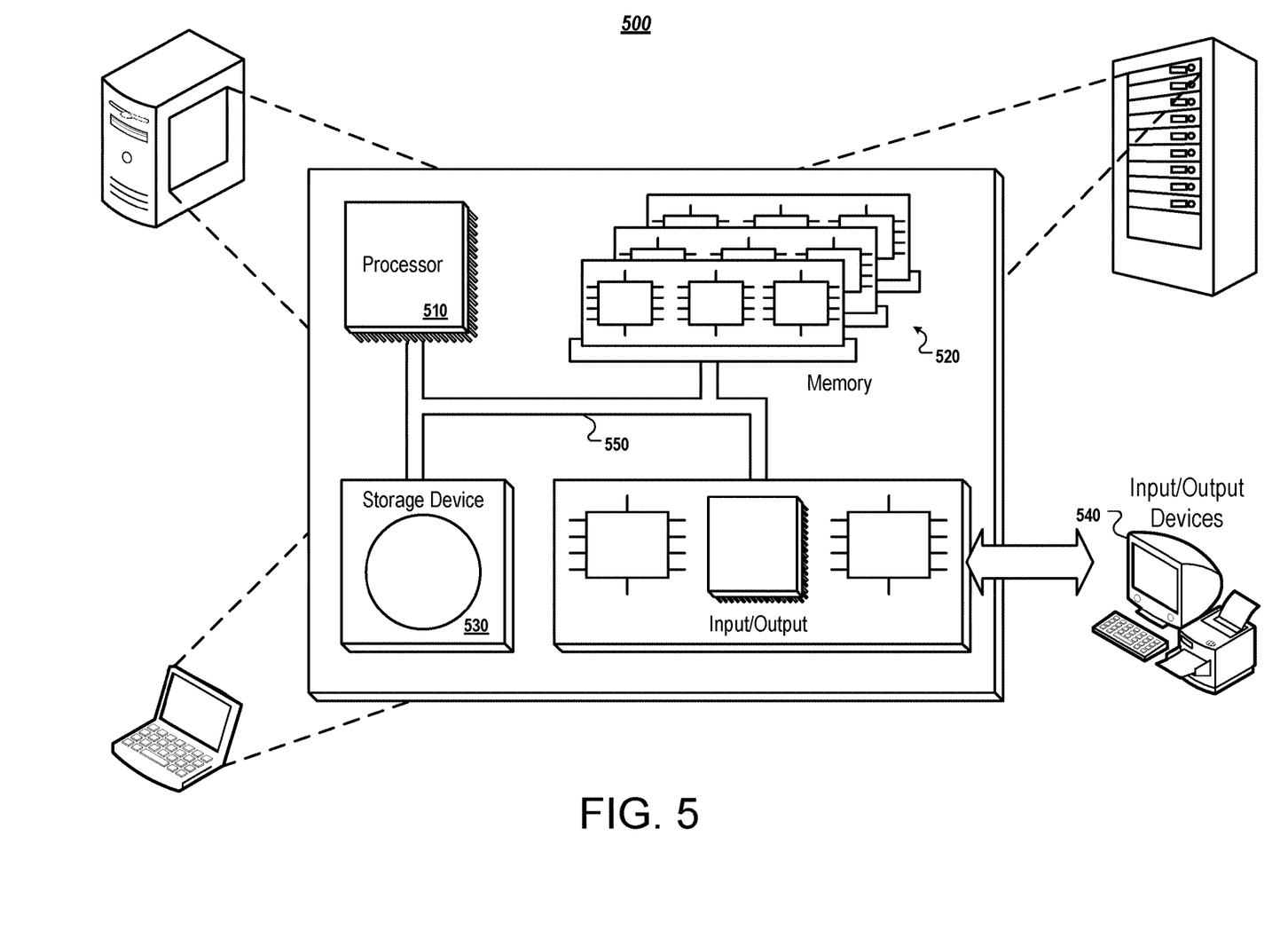
FIG. 5 is a diagram of exemplary computing devices.

FIG. 5 is a schematic diagram of an example of a generic computer system 500. The system 500 can be used for the operations described in association with FIGS. 1-4 according to some implementations. The system 500 may be included in the system 100.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by a message initiator, an indication that a particular message recipient has initiated communication of a message through a particular messaging service;
determining, by the message initiator, that preference data for the particular message recipient indicates that messages are not to be transmitted to the particular message recipient through the particular messaging service;
in response to determining that the preference data for the particular message recipient indicates that the messages are not to be sent to the particular message recipient through the particular messaging service, providing, by the message initiator, a prompt that both includes text that indicates that the messages are not to be sent to the particular message recipient through the particular messaging service and requests that the particular message recipient confirm that the message is to be transmitted through the particular messaging service;
receiving, by the message initiator, a response from the particular message recipient confirming that the message is to be transmitted through the particular messaging service; and
in response to receiving the response from the particular message recipient confirming that the message is to be transmitted through the particular messaging service, transmitting, to a messaging management service, a request to transmit a message, wherein the request includes at least (i) a message content type identifier that indicates a type of the message that is to be transmitted, (ii) data identifying the particular message recipient, and (iii) data indicating that the particular message recipient has overridden the preference data indicating that messages are not to be transmitted to the particular message recipient through the particular messaging service.

2. The computer-implemented method of claim 1, wherein providing, by the message initiator, the prompt that both includes text that indicates that the messages are not to be sent to the particular message recipient through the particular messaging service and requests that the particular message recipient confirm that the message is to be transmitted through the particular messaging service comprises:
   providing, by the message initiator and through an interface of a website associated with the message initiator, the prompt.

3. The computer-implemented method of claim 2, wherein receiving, by the message initiator, the response from the particular message recipient confirming that the message is to be transmitted through the particular messaging service comprises:
   receiving, by the message initiator and through the interface of the website associated with the message initiator, a response from the particular message recipient confirming that the message is to be transmitted through the particular messaging service.

4. The computer-implemented method of claim 1, wherein the particular messaging service is a social networking service.

5. The computer-implemented method of claim 1, wherein the request further includes (iv) a set of content that is to be included in the message that is to be transmitted.

6. The computer-implemented method of claim 1, wherein the preference data further identifies a language in which messages are to be provided to the particular message recipient.

7. The computer-implemented method of claim 1, wherein transmitting, to a messaging management service, a request to transmit a message comprises:
   transmitting, by the message initiator and to the messaging management service, a request (i) under a simple object access protocol and (ii) to transmit a message.

8. A system comprising:
   one or more computers and one or more storage devices storing instructions that are operable, when executed by the one or more computers, to cause the one or more computers to perform operations comprising:
   receiving, by a message initiator, an indication that a particular message recipient has initiated communication of a message through a particular messaging service;
   determining, by the message initiator, that preference data for the particular message recipient indicates that messages are not to be transmitted to the particular message recipient through the particular messaging service;
   in response to determining that the preference data for the particular message recipient indicates that the messages are not to be sent to the particular message recipient through the particular messaging service, providing, by the message initiator, a prompt that both includes text that indicates that the messages are not to be sent to the particular message recipient through the particular messaging service and requests that the particular message recipient confirm that the message is to be transmitted through the particular messaging service;
   receiving, by the message initiator, a response from the particular message recipient confirming that the message is to be transmitted through the particular messaging service; and
   in response to receiving the response from the particular message recipient confirming that the message is to be transmitted through the particular messaging service, transmitting, to a messaging management service, a request to transmit a message, wherein the request includes at least (i) a message content type identifier that indicates a type of the message that is to be transmitted, (ii) data identifying the particular message recipient, and (iii) data indicating that the particular message recipient has overridden the preference data indicating that messages are not to be transmitted to the particular message recipient through the particular messaging service.

9. The system of claim 8, wherein providing, by the message initiator, the prompt that both includes text that indicates that the messages are not to be sent to the particular message recipient through the particular messaging service and requests that the particular message recipient confirm that the message is to be transmitted through the particular messaging service comprises:
   providing, by the message initiator and through an interface of a website associated with the message initiator, the prompt.

10. The system of claim 9, wherein receiving, by the message initiator, the response from the particular message recipient confirming that the message is to be transmitted through the particular messaging service comprises:
    receiving, by the message initiator and through the interface of the website associated with the message initiator, a response from the particular message recipient confirming that the message is to be transmitted through the particular messaging service.

11. The system of claim 8, wherein the particular messaging service is a social networking service.

12. The system of claim 8, wherein the request further includes (iv) a set of content that is to be included in the message that is to be transmitted.

13. The system of claim 8, wherein the preference data further identifies a language in which messages are to be provided to the particular message recipient.

14. The system of claim 8, wherein transmitting, to a messaging management service, a request to transmit a message comprises:
    transmitting, by the message initiator and to the messaging management service, a request (i) under a simple object access protocol and (ii) to transmit a message.

15. A non-transitory computer-readable medium storing software comprising instructions executable by one or more computers which, upon such execution, cause the one or more computers to perform operations comprising:
    receiving, by a message initiator, an indication that a particular message recipient has initiated communication of a message through a particular messaging service;
    determining, by the message initiator, that preference data for the particular message recipient indicates that messages are not to be transmitted to the particular message recipient through the particular messaging service;
    in response to determining that the preference data for the particular message recipient indicates that the messages are not to be sent to the particular message recipient through the particular messaging service, providing, by the message initiator, a prompt that both includes text that indicates that the messages are not to be sent to the particular message recipient through the particular messaging service and requests that the particular message recipient confirm that the message is to be transmitted through the particular messaging service;

receiving, by the message initiator, a response from the particular message recipient confirming that the message is to be transmitted through the particular messaging service; and in response to receiving the response from the particular message recipient confirming that the message is to be transmitted through the particular messaging service, transmitting, to a messaging management service, a request to transmit a message, wherein the request includes at least (i) a message content type identifier that indicates a type of the message that is to be transmitted, (ii) data identifying the particular message recipient, and (iii) data indicating that the particular message recipient has overridden the preference data indicating that messages are not to be transmitted to the particular message recipient through the particular messaging service.

16. The medium of claim 15, wherein providing, by the message initiator, the prompt that both includes text that indicates that the messages are not to be sent to the particular message recipient through the particular messaging service and requests that the particular message recipient confirm that the message is to be transmitted through the particular messaging service comprises:

providing, by the message initiator and through an interface of a website associated with the message initiator, the prompt.

17. The medium of claim 16, wherein receiving, by the message initiator, the response from the particular message recipient confirming that the message is to be transmitted through the particular messaging service comprises:

receiving, by the message initiator and through the interface of the website associated with the message initiator, a response from the particular message recipient confirming that the message is to be transmitted through the particular messaging service.

18. The medium of claim 15, wherein the particular messaging service is a social networking service.

19. The medium of claim 15, wherein the request further includes (iv) a set of content that is to be included in the message that is to be transmitted.

20. The medium of claim 15, wherein the preference data further identifies a language in which messages are to be provided to the particular message recipient.

* * * * *